United States Patent

Frankeny et al.

[15] 3,675,133

[45] July 4, 1972

[54] APPARATUS AND METHOD INDEPENDENTLY VARYING THE WIDTHS OF A PLURALITY OF PULSES

[72] Inventors: Richard F. Frankeny; Joey K. Tuttle, both of Longmont, Colo.

[73] Assignee: International Business Machines Corporation, Armonk, N.Y.

[22] Filed: June 21, 1971

[21] Appl. No.: 155,091

[52] U.S. Cl. ................................328/55, 307/265, 307/269, 307/294, 328/58, 328/63, 328/155

[51] Int. Cl. ....................................H03k 5/159, H03k 17/26

[58] Field of Search .........................307/265, 293, 294, 269; 328/55, 56, 58, 63, 155

[56] References Cited

UNITED STATES PATENTS 3,189,835 6/1965 Marsh, Jr. ................................328/63
3,426,218 2/1969 Baynard, Jr. ............................307/265
3,440,546 4/1969 Nelson ..............................307/265 X
3,586,985 6/1971 Schoendorff.......................307/293 X
3,593,158 7/1971 Day et al. ..........................307/293 X

*Primary Examiner*—Stanley D. Miller, Jr.
*Attorney*—Gunter A. Hauptman

[57] ABSTRACT

Input data comprises a plurality of serial random-width pulses each having a leading and a trailing edge. The relative position of each leading and trailing edge is independently adjustable in accordance with external data to give output data comprising a plurality of serial pulses derived from, but selectively different than, the input data. A data clock generates a transition signal for each pulse edge. Each transition signal is directed into a different variable delay circuit which imposes a delay dictated by external data. The delayed transitions operate a pulse regenerating flip-flop to form the output data. Appropriate gating controls permit width control of only selected pulses. By defining normal data as delayed input data, output data may be shifted either forward or backward in time relative to the normal data.

13 Claims, 8 Drawing Figures

DATA CLOCK 2

APPARATUS AND METHOD INDEPENDENTLY VARYING THE WIDTHS OF A PLURALITY OF PULSES

BACKGROUND OF THE INVENTION

1. Field of the Invention

The invention relates to electronic data processing and more particularly to modifying electronic signals representing data.

2. Description of the Prior Art

A series of pulses received from an input must frequently be modified for use at an output without substantially effecting the information manifested by the pulses. For example, signals received from a communications path may be too degraded for utilization by standard receiving equipment. Analysis of the degradation may be performed with the aid of computing equipment and the received pulses adjusted, in accordance with the analysis, to bring the pulse characteristics within the limits of correct operation of the available receiving equipment. In another example, initially correct signals may be intentionally degraded by a known amount to test the limits of operation of electronic equipment receiving the signals or to compensate for distortions in the equipment.

In the prior art, pulse modification techniques are well known but do not address the problem of independently and selectively modifying both edges (leading and trailing) of a plurality of serially received pulses. In addition to the examples cited above, this problem is especially significant where the pulses represent data recorded on magnetic tape because such serial pulses occur in a plurality of parallel trains, one for each track of recorded data. Typically, prior art pulse width modification apparatus has stretched a single pulse by passing it through a delay circuit having a delay characteristic which varies with time or the like. Pulse edge transitions have been used to control output pulse shapes, but the problem of independently controlling both edges of a plurality of serial pulses is not addressed by such means.

SUMMARY OF THE INVENTION

The invention independently varies the widths of a plurality of serial input pulses by changing the positions of their leading and trailing edges. The time of the leading and trailing edges of each input pulse is determined and then delayed a variable amount in accordance with data from some external source. The width of a pulse may be decreased by delaying its leading edge more than its trailing edge, and the width may be extended by delaying the trailing more than the leading edge. For a series of pulses, by delaying each edge of each pulse separately, the delayed edges will define a series of output pulses having widths determined by the positions of the edges. An output edge position may precede its corresponding input pulse position by delaying all input pulses a fixed amount and then defining output pulse positions relative to the delayed "-normal" positions.

Apparatus for achieving these results includes circuits for generating a transition pulse for each edge, each transition pulse then being delayed a desired amount. Each transition pulse may be sent to a different delay means, or a single delay means may be selectively varied for each transition pulse sent to it. The delayed transition pulses control a pulse generating circuit for supplying output pulses defined by the delayed transition pulses. Input data may be selectively routed through, and around, one or more of the delay circuits to combine adjusted width pulses with unadjusted ones. The invention is applicable to tape, disc, drums, etc., recording, or other multiple track, channel, or path applications by providing a plurality of identical circuits, one for each parallel path. For example, intentionally degraded signals may be recorded on a magnetic tape for subsequently testing a tape system's response to the recorded signals or, if desired, the signals may be directly supplied to test a tape system.

The foregoing and other features and advantages of the invention will be apparent from the following more particular description of the preferred embodiments of the invention as illustrated in the accompanying drawings.

DETAILED DESCRIPTION

Figures 1A, 1B:
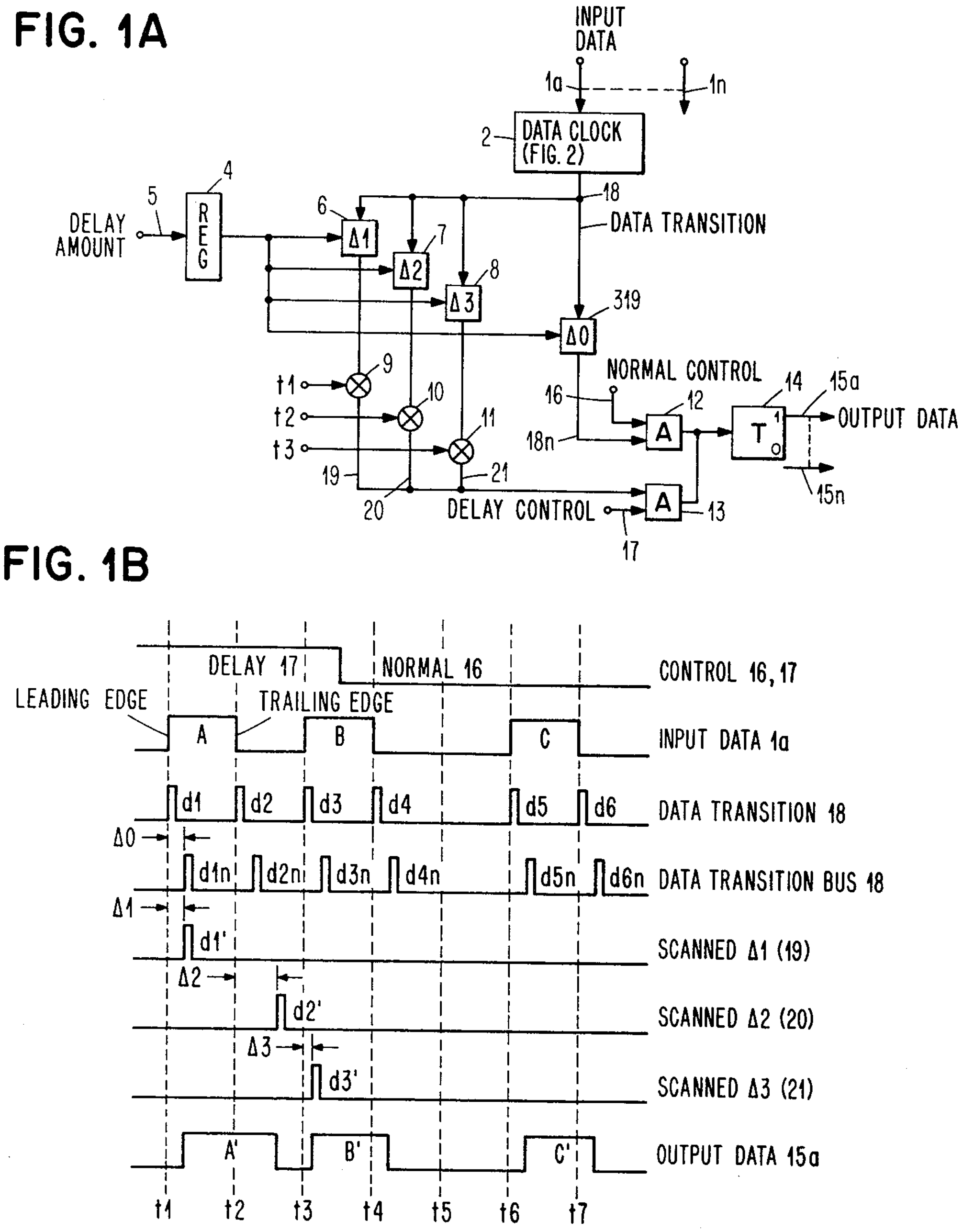
FIG. 1A is a generalized logic diagram of a circuit illustrating the invention.
FIG. 1B is a waveform diagram showing the operation of the circuit of FIG. 1A.

FIG. 1A illustrates apparatus for independently varying widths of a plurality of pulses. The input data received on line 1*a* is varied in accordance with external delay and control information on lines 5, 16, and 17 to form output data on line 15 representing one of any number of selectable outputs. A plurality of circuits similar to those shown in FIG. 1A may be provided for additional input data lines 1*b* through 1n and output data lines 15*b* through 15*n*; the external delay information being supplied on either line 5 or additional lines, not shown. While the explanation will be directed primarily to the circuit for input data line 1*a* and output data line 15*a*, it applies equally well to a system for servicing a group of lines 1*a* through 1n and 15*a* through 15*n*.

Input data information, having a leading edge transition and a trailing edge transition, entering on line 1*a* is received by a data clock 2 which forms a single pulse for each input data transition. The data clock 2 may comprise any circuit capable of this operation. An illustrative circuit is explained subsequently with respect to FIG. 2. The data transition signals from the data clock 2 are supplied to a point 18 to which are connected a number of delay circuits 6, 7, and 8 which may be externally controlled by amounts stored in register 4 in accordance with information supplied on delay amount line 5. While a typical variable delay circuit is the Model 1223, Programmable Timing Unit, manufactured by EH Research, any sonic, electronic (such as single shot, circulating shift register, etc.), electromechanical (drum, tape, etc.), etc. circuit may be substituted. The data transition signals at point 18 are varied different amounts Δ1, Δ2, and Δ3 by the delay lines 6, 7, and 8 in accordance with the external information. Delayed data transition signals are scanned by operation of gates 9, 10, and 11 in accordance with signals *t*1, *t*2, and *t*3 placing the selected delayed transition signals on lines 19, 20, and 21. These signals are then combined (OR'd) at the input of AND circuit 13 and, upon the occurrence of a delay control signal on line 17, operate the binary input of a trigger 14 to supply output data on line 15*a*. Successive data transition signals reverse the trigger 14 from 1 to 0 and back again to restore the delayed data transition signals to output data form. While a synchronized trigger is desirable to establish correct phasing, circuits for accomplishing this are, for simplicity, not shown because they are well known in the art. An additional delay circuit 319 is connected to the point 18 to supply to the AND circuit 12 a signal upon the occurrence of a normal control signal on line 16. The circuit's delay Δ0 sets a normal output data standard. For example, if delay circuit 6 has a delay period Δ1 less than the delay Δ0 of delay circuit 319, the delayed data transition on line 19 will appear to occur earlier than the transition on line 18*n*. Output data may thus be varied forward and backward in time relative to the "normal" data passed through delay 319.

The operation of the circuit of FIG. 1A will be explained with reference to FIG. 1B. The purpose of the circuit is to take input data 1a and vary the leading and trailing edges of pulses A, B, and C to supply output data A', B', and C' on line 15*a*. The data clock 2 converts the input data signals on line 1a into a plurality of data transition signals at points 18 and 18$n$. Data transition signal d1 corresponds to the leading edge of pulse A and data transition signal $d2$ corresponds to the trailing edge of pulse A. Data transition signals $d3$ through $d6$ similarly correspond to leading and trailing edges of pulses B and C. Signals d1 through d6 are applied to the delay circuits 6 through 8 and scanned at times $t1$, $t2$, and $t3$ to provide signals $d1'$ on line 19, $d2'$ on line 20, and $d3'$ on line 21. Signal $d1'$ is signal d1 delayed an amount Δ1 corresponding to the delay of delay circuit 6, etc. It will be understood that the scanning of the delay circuits 6, 7, and 8 can also be accomplished at the inputs to the circuits. The scanned delayed signals on lines 19, 20, and 21 are applied to the AND circuit 13; and all signals $d1$ through $dn$, delayed an amount Δ0 by delay circuit 319, are applied as signals d1n through $d6n$, to AND circuit 12. During the occurrence of a delay control signal on line 17, the trigger 14 reverses in accordance with the occurrence of signals $d1'$, $d2'$, and $d3'$. , in accordance with signals $d4n$, $d5n$, and $d6n$ when the normal control signal occurs on line 16, as shown. Comparison of the output data A', B', and C' with the input data A, B, and C shows the control exerted over the leading and trailing edges. The "normal" output data is delayed an amount Δ0, and the "delayed" output is delayed more or less than this amount.

Figure 2:
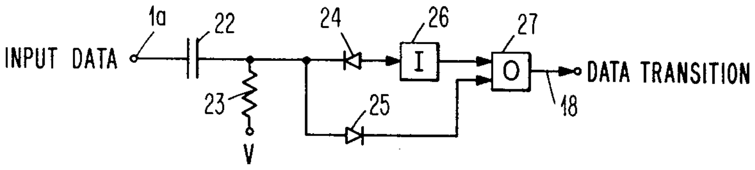
FIG. 2 is a circuit diagram illustrating a data clock usable in the circuit of FIG. 1A.

FIG. 2 shows a circuit illustrative of the data clock 2. Input data from line 1$a$ results in positive data transitions on line 18 corresponding to the leading and trailing edges of the input data. If desired, negative transitions may be obtained by a simple modification of the circuit. A differentiating network, made up of capacitor 22 and resistor 23, supplies differentiated data transitions to diodes 24 and 25. Positive transitions pass through diode 25, and negative transitions through diode 24. Inverter 26 connected to the negative diode 24 supplies positive signals to the OR circuit 27. Thus, negative and positive transitions are recognized and supplied as positive transitions on the data transition line 18.

Figure 3A:
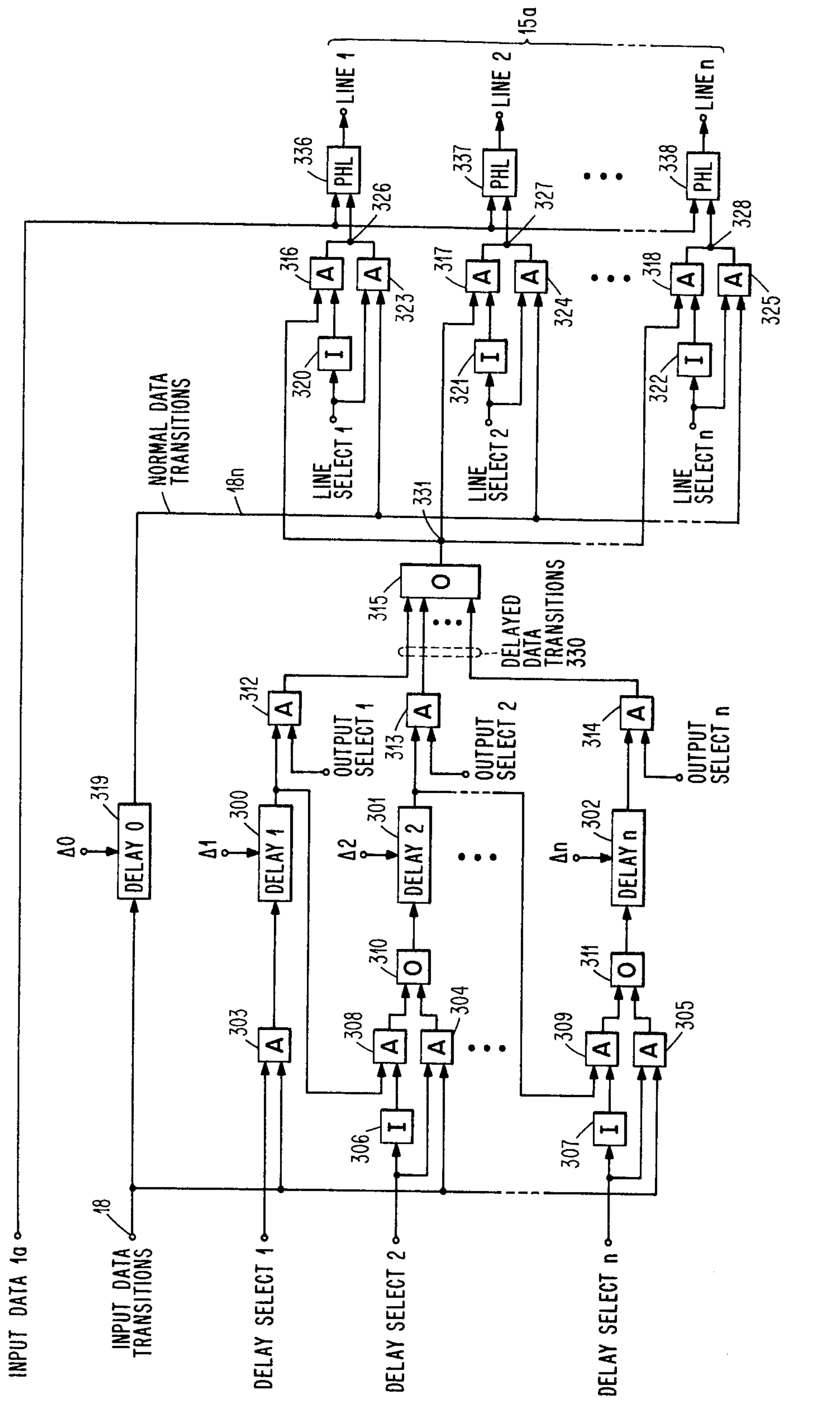
FIG. 3A is a detailed logic diagram illustrating a system incorporating the invention.

Referring to FIG. 3A, a system utilizing the invention will now be described. Input data transitions supplied on line 18 appear as outputs on one of lines 1 through $n$, selected in accordance with line selection criteria, delayed in accordance with external information. The particular amount of delay for selected input data leading and trailing edges may be preset, varied in accordance with external conditions occuring during the selection operation, or any combination of these in accordance with signals on delay select lines 1 through $n$, output select lines 1 through $n$, and delay quantities Δ1 through Δ$n$. Output data is supplied to selected ones of lines 1 through $n$ in accordance with signals on line select lines 1 through $n$.

Figure 3B:
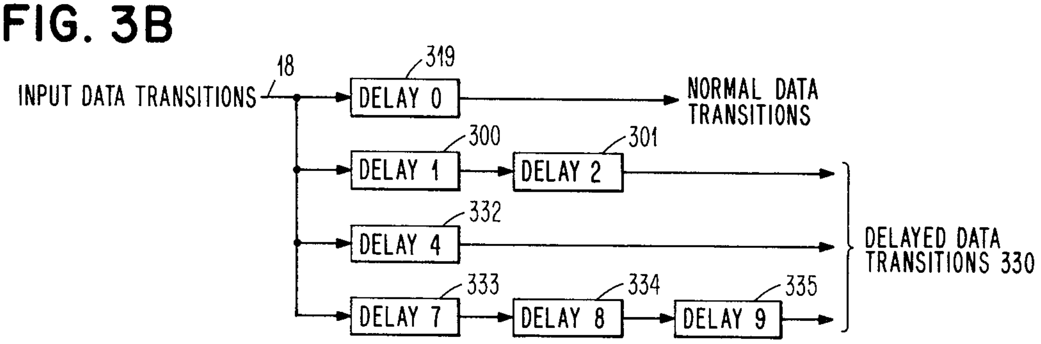
FIG. 3B is a diagram showing the flow of signals through portions of the circuit of FIG. 3A.

Input data transitions on line 18 having a pulse width of approximately $20\times10^{-9}$ sec. are supplied from a circuit such as data clock 2 previously described. The input data transition signals are applied to a delay circuit 319, which places normal data transitions on line 18$n$, and also to a plurality of variable delay lines, 1 through $n$ for example. Delay circuits 300, 301, and 302 are set to delay values ranging from 10 nanoseconds to 1 millisecond in accordance with external delay information on corresponding lines Δ1 through Δ$n$. The delay circuits 1 through n are interconnected in accordance with signals placed on delay select lines 1 through $n$ and output select lines 1 through n to give delays variable from 10 nanoseconds to $n$ milliseconds. FIG. 3B shows one possible example of the interconnection of a large number of delay circuits. Delay circuit 391 is connected to supply normal data transitions. Delay circuits 300 and 301 are connected in series to the input data transitions by the application of delay select 1, and output select 2 signals. Delay 4 is directly connected to the input data transitions 18 and to the OR circuit 315 by application of delay select 4 and output select 4 signals. Delay circuits 333, 334, and 335 are connected in series by the application of a delay select 7 output select 9 signals. In this manner, together with changes in delay values Δ1 through Δ$n$, the delays may be predetermined and, when desired, modified during operation.

Delayed data transitions are combined together in OR circuit 315 having an output 331 available to each of lines 1 through n in accordance with the presence of line select signals at the inputs of sample and hold PHL circuits 336, 337, 338, etc. Normal data transitions are available to selected lines on line 18n upon occurrence of line select signals which cause inputs to the AND circuits 323, 324, 325, etc. due to the inverters 320, 321, 322, etc. Absence of line select signals causes signals to corresponding ones of AND circuits 316, 317, 318, etc. by supplying separate line select signals normal data transitions may be supplied to some lines, delayed data transitions to other lines, and no signals to still other lines. While output data lines 15a are identified generally as "lines," the lines can supply signals for any data or control purposes. The sample and hold PHL circuits, to be explained with reference to FIGS. 4A and 4B, convert data transitions into pulse information in a manner similar to a phase-independent trigger.

Figure 3C:
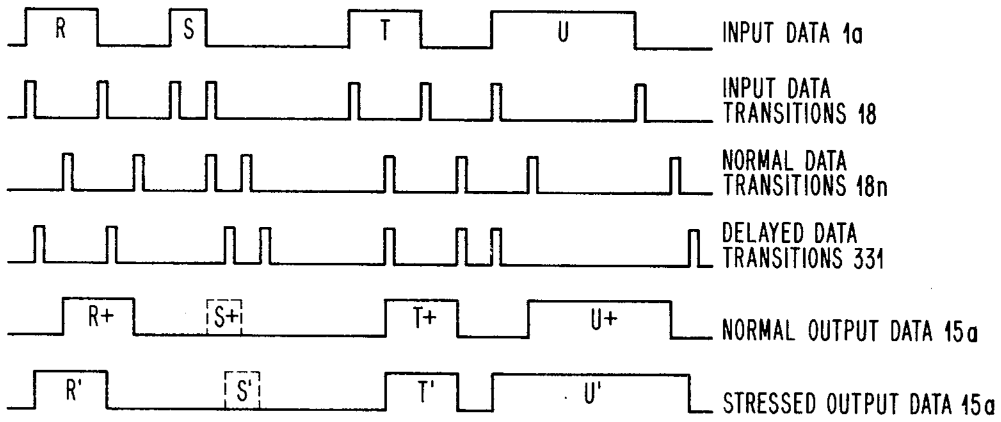
FIG. 3C is a waveform diagram illustrating the operation of the circuit of FIG. 3A.

The operation of the system of FIG. 3A will now be explained with reference to FIG. 3C. The input data R, S, T, U, etc., on line 1a a (to the data clock in FIG. 1A) is modified to appear as either stressed output data R', S', T', U', etc., or normal output data R+, S+, T+, U+, etc., on line 15$a$. The normal output data is the input data delayed by an amount determined by delay circuit 319 making it possible, by using delay circuits 300, 301, 302, etc., to achieve outputs which either follow or precede the input data in time. For example, stressed output R' occurs earlier than normal output R+.

Input data on line 1$a$ is converted to input data transitions on line 18 which is connected to the variable delay circuits 300, 301, 302, etc., to form delayed data transitions on line 331 and to delay circuit 319 to form normal data transitions on line 18$n$. The delayed data transitions corresponding to both edges of input data R are each delayed the same amount and may therefore each be sent through the same delay circuit. Similarly, second and third delay circuits serve both edges of input data S and T, respectively. The leading edge of input data U is not sent through any delay circuit and the trailing edge is sent to a fourth delay circuit. It will be understood, that a single delay line may be used for all input data and its value varied during operation of the circuit. The line select lines 1 through n are selectively activated to distribute the signals from lines 331 and 18n to line 1 through n of data output 15$a$.

Figure 4A:
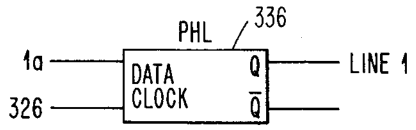
FIGS. 4A and 4B are block and waveform diagrams of a logic circuit used in FIG. 3A.
Figure 4B:
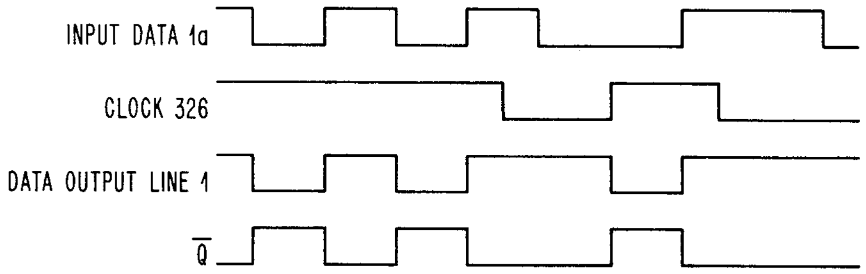

Referring to FIGS. 4A and 4B, the sample and hold PHL circuits used for signal distribution will now be explained. A typical PHL circuit 336 has a data input supplied directly from line 1a, a clock input supplied by line 326 from AND circuits 316 and 323, and two complimentary outputs. The data supplied on line 1$a$ is gated in accordance with clock signals on line 326 so that the Q output to data output line 1 follows the input data on line 1$a$ whenever the clock signal on line 326 is present. The value of the data signal on line 1$a$ is latched whenever the clock signal falls. Thus, transitions at input 326 are converted into data signals each having a leading edge corresponding to one transition and a trailing edge corresponding to the next transition. There are restrictions on the operation of the circuit imposed by components chosen for the illustrated embodiment. For example, normal and delayed data transitions must not occur later than one pulse interval following the leading or trailing edge causing the transition. As illustrated by the dashed line representing the position of pulse S' in FIG. 3C, delayed transitions occurring after the input data pulse do not cause an output data pulse. If desired, such restrictions may be overcome by using a delay element which can store data for more than one period and/or a synchronized trigger, as previously described, or its equivalent.

While the invention has been particularly shown and described with reference to preferred embodiments thereof, it will be understood by those skilled in the art that various changes in form and details may be made therein without departing from the spirit and scope of the invention.

What is claimed is:

1. The method of independently varying the positions of the leading and trailing edges of a plurality of serial electronic pulses comprising the steps of:

receiving the series of pulses;

detecting each of the edges of each of the pulses;

supplying a separate indication for each of the detected edges;

independently delaying each indication a preselected amount;

combining the delayed indications into a series of indications; and generating a series of output pulses each having an edge determined by a different one of the series of delayed indications.

2. The method of claim 1 comprising the additional steps of:

generating a series of normal input pulses by delaying the received series of pulses, and delaying the position of the output pulses relative to the normal input pulses.

3. A method of adjusting at an output the width of a series of electronic pulses received at an input, comprising the steps of:

recognizing leading and trailing edges of each of the input pulses;

creating an indication corresponding to the time of occurrence of each edge;

delaying the time of occurrence of each indication a predetermined amount of time; and generating at the output a series of pulses having trailing and leading edges, each edge corresponding to the time of occurrence of a different delayed indication.

4. In combination:

a source of input data comprising a number of input data pulse series, each pulse having a first and second point of signal change;

transition means, connected to said source and operative in accordance with said signal changes, for supplying a transition signal for each signal change;

delay means, connected to said transition means and operative in accordance with external control, for delaying selected ones of said transition signals an amount determined by said external controls; and output pulse generating means, connected to said delay means and operative in response to selected ones of said delayed transition signals, for generating a series of output data pulses, each having two edges, each edge having a position in time corresponding to the position in time of a different one of said delayed transition signals.

5. The combination of claim 4 wherein there are provided means connected between the delay means and the output pulse generating means, operative by external controls, for selectively connecting said delay means to said output pulse generating means.

6. The combination of claim 4 wherein there are provided a number of delay means less than the number of transition signals to be delayed and the amount of delay of the delay means determined by the external controls is changed for different transition signals.

7. The combination of claim 4 wherein there are provided delay means connected to the source of input data for generating delayed input data, said output data pulse edge time positions being defined relative to the delayed input data.

8. The combination of claim 5 wherein there are provided delay means connected to the source of input data for generating delayed input data, said output data pulse edge time positions being defined relative to the delayed input data.

9. The combination of claim 6 wherein there are provided delay means connected to the source of input data for generating delayed input data, said output data pulse edge time positions being defined relative to the delayed input data.

10. Apparatus for independently varying by preselected amounts the positions of the leading and lagging pulse edges of a plurality of pulse series received at a plurality of inputs, comprising for each series:

transition detection means, connected to an input, for receiving a pulse series and generating as a function of each pulse edge detected an input data transition signal;

a number of variable delay means, each connectable to receive signals from said transition detection means to delay input data transition signals by predetermined amounts;

output selection means, each connected to delay means and operable, responsive to external selection signals, to supply a series of output transition signals as a function of the delayed input data transition signals; and output translation means, connected to said output selection means, for generating a series of output pulses as a function of the delayed transition signals, one for each two transition signals.

11. The apparatus of claim 10 wherein the delay means each comprise a variable delay circuit adjustable to a delay amount by external means.

12. The apparatus of claim 11 wherein there are provided data normalization means, connected to said transition detection means and responsive to said data transition to generate a sequence of normalized transition signals corresponding to uniformly delayed input data transition signals.

13. The apparatus of claim 12 wherein the output selection means is also connected to receive the normalized transition signals and supply output transition signals as a function of selected ones of said normalized and delayed transition signals.

* * * * *